Figure 3:
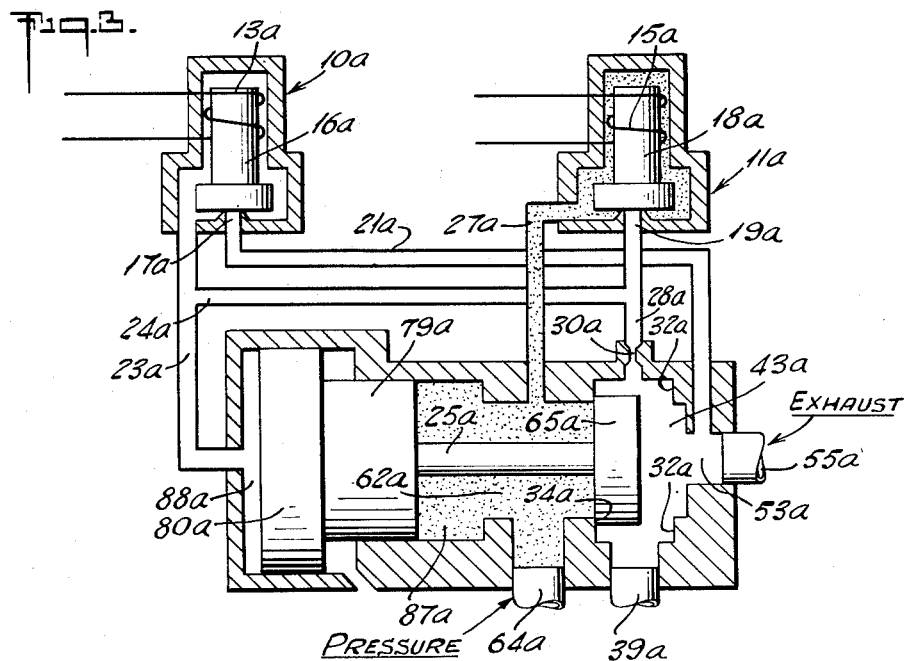

Jan. 1, 1957
A. V. H. CANFIELD
2,775,982
DIFFERENTIAL-PISTON VALVE AND DUAL
PILOT-VALVE CONTROL THEREFOR
Filed May 4, 1954
3 Sheets-Sheet 1
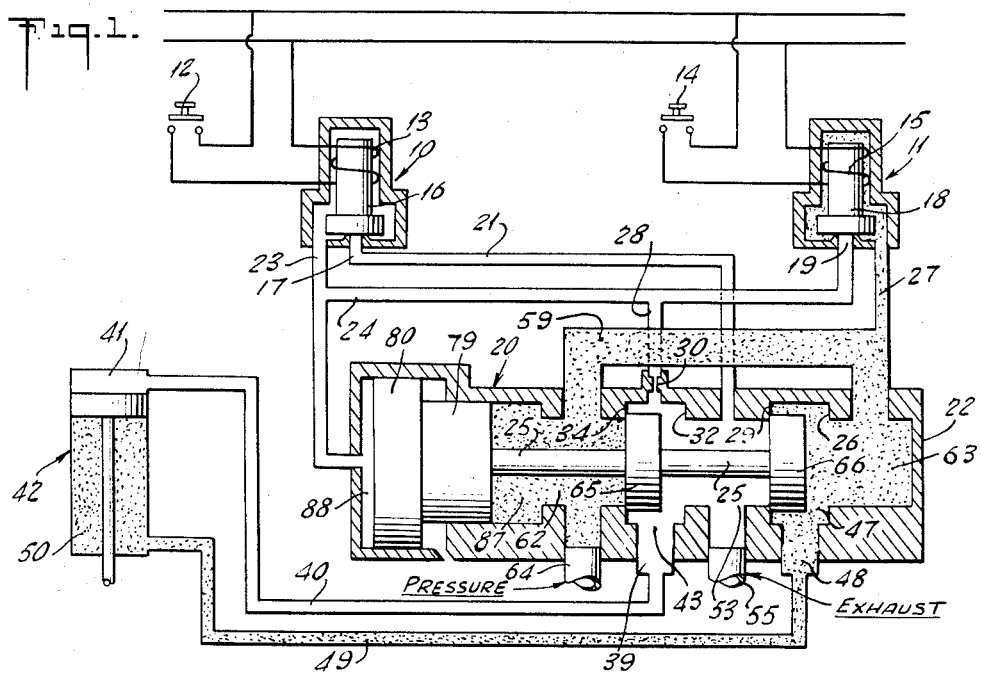
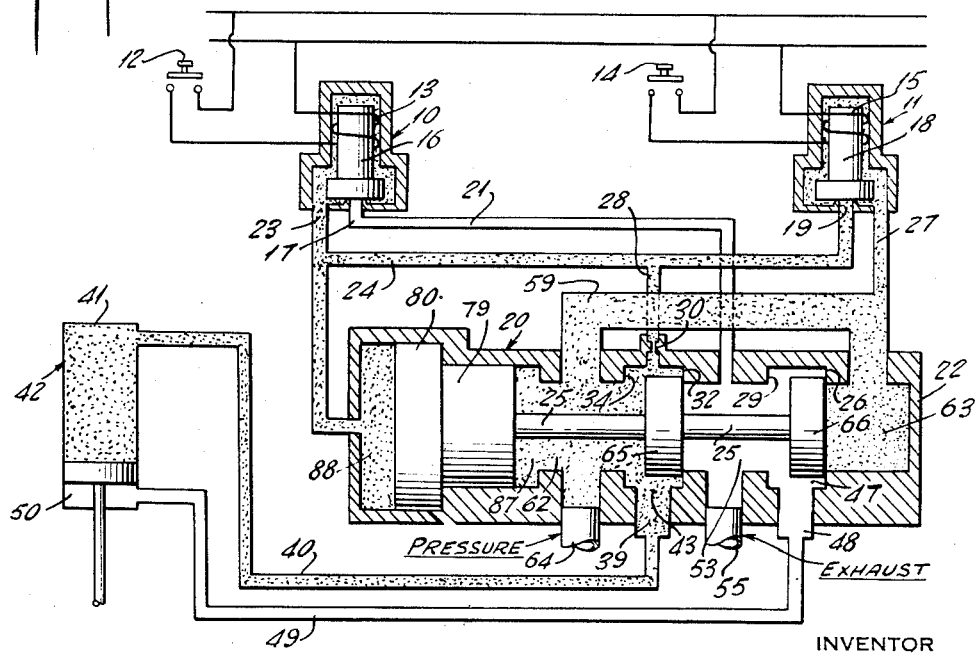
INVENTOR
ALBERT V. H. CANFIELD
BY
*Frederick Breiter*
ATTORNEY INVENTOR
ALBERT V. H. CANFIELD
BY Frederick Breitenfeld
ATTORNEY

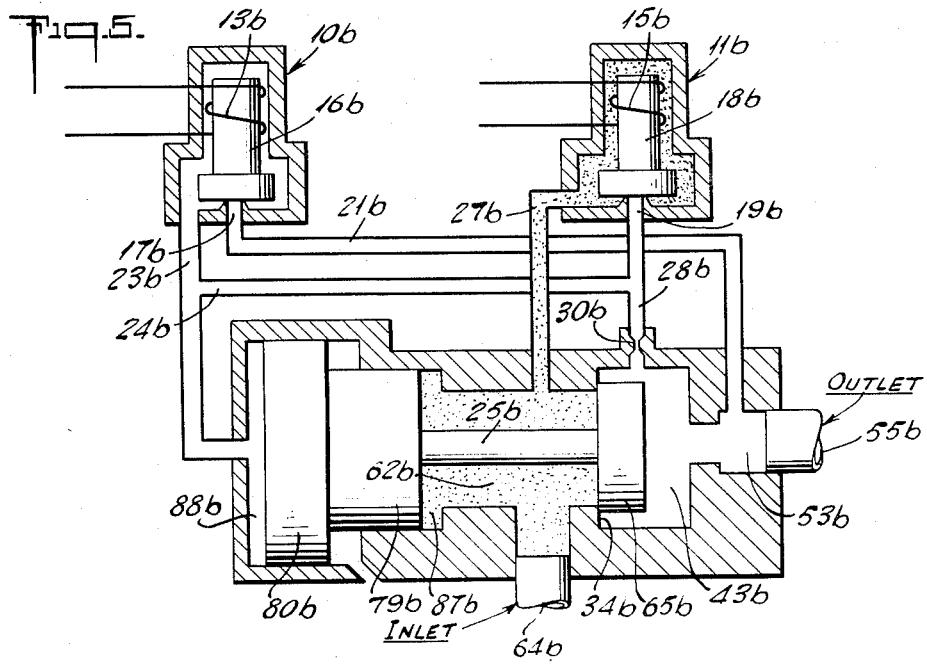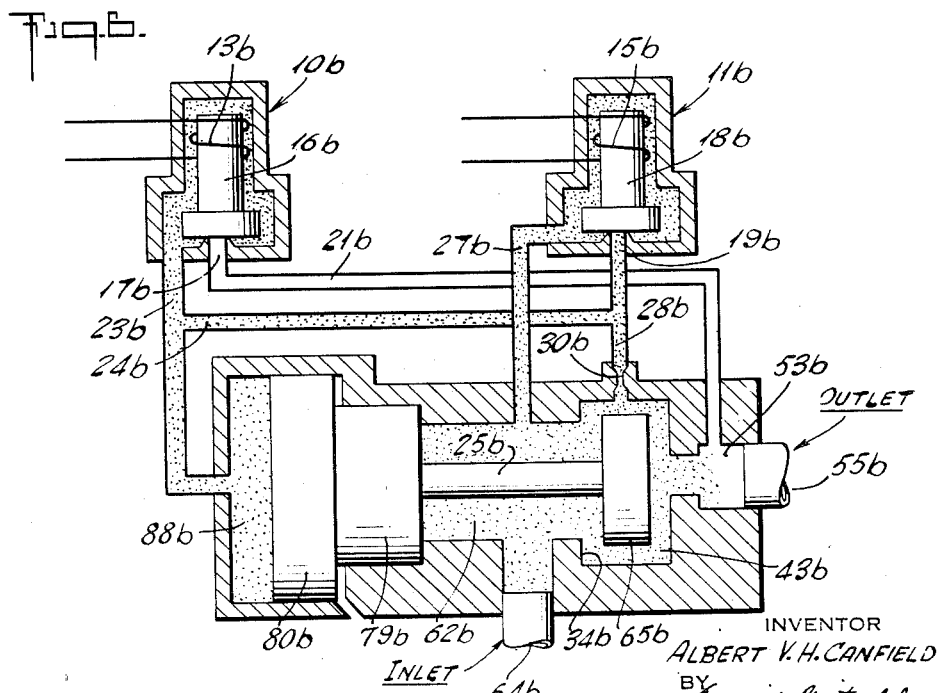

United States Patent Office 2,775,982
Patented Jan. 1, 1957

2,775,982

DIFFERENTIAL-PISTON VALVE AND DUAL PILOT-VALVE CONTROL THEREFOR

Albert V. H. Canfield, Cedar Grove, N. J., assignor to Automatic Switch Co., Orange, N. J., a corporation of New York Application May 4, 1954, Serial No. 427,429

2 Claims. (Cl. 137—620)

My present invention relates generally to valves, and has particular reference to valves of the type in which reciprocatory movements of a valve element or elements are controlled by a differential piston.

Such a valve is exemplified by the four-way valve shown and described in United States Patent No. 2,624,585; but the applicability of the invention is not limited to four-way valves, as will be pointed out hereinafter.

Valves of the differential-piston type have many uses in industry, varying from the simple starting and stopping of fluid flow in a pipeline to more elaborate kinds of control. For example, a four-way valve of the kind shown in Patent No. 2,624,585 is commonly used to connect two chambers alternately to a source of high pressure fluid and an exhaust. These chambers may be, for example, those on the opposite sides of a piston in a hydraulic or pneumatic cylinder, and in such an installation the function of the four-way valve would be to control the actuation of the piston, which in turn would control or actuate something which is to be reciprocated, such as a gate valve, a molding press, a clamp, or the like.

The operation of a valve of this kind is dependent upon a pilot mechanism that controls the fluid pressures applied to the opposite faces of the differential piston. In the valve shown in the aforementioned patent, the pilot is a three-way solenoid valve that is held in one or the other of two operative positions by energization and de-energization of the solenoid.

It is an object of the present invention to provide certain improvements whereby the operation of the valve is so controlled that it will remain in either setting without dependence upon any energization of a pilot. One advantage of this lies in the fact that current failure becomes ineffective to alter the setting of the valve.

Another objective is to provide an improved structure in which the movements of the valve can be more economically controlled, and in which it can be safely relied upon to remain in the desired setting at all times.

A feature of the present improvement consists in the employment of two independently operable pilot valves, each of simple two-way character, the arrangement being such that a merely momentary actuation of one or the other of the pilot valves is sufficient to effect movement of the differential piston and to hold it in the resultant setting. Thus, if the pilot valves are solenoid valves, as is preferably the case, only a momentary expenditure of electric current is required to achieve the desired result. The pilot valves are individually actuatable by means either close at hand or at a distance, and because of their intermittent energization during relatively short periods of time they can be safely operated with larger amounts of current, thus achieving greater force in relation to their size than would be possible if continued energization were called for.

Another feature of the invention resides in the provision of special fluid communications so arranged that the possible leakage of actuating fluid past either pilot valve, while it is closed, will be ineffective to disturb the setting of the differential piston. This affords a further assurance that the valve will maintain its setting.

The manner of achieving the foregoing general objectives and advantages, and such other objects and advantages as may hereinafter appear or be pointed out, is shown by way of example in the accompanying drawings, in which—

Figure 4:
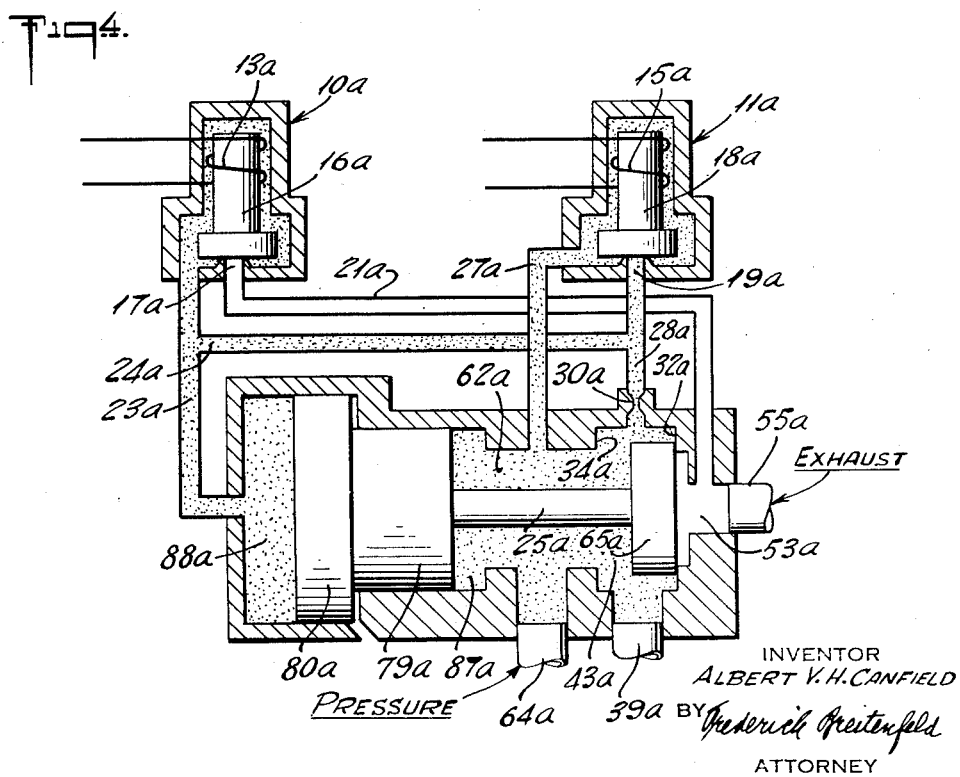

Figures 1 and 2 are diagrammatic views illustrating the general structure and mode of functioning of an improved valve of the four-way type, Figure 1 showing the four-way valve in one of its settings, Figure 2 showing it in the other of its settings, the two pilot valves being shown in each case in their normal closed condition;

Figures 3 and 4 are views similar to Figures 1 and 2, showing the applicability of the invention to a three-way valve of the differential-piston type; and Figures 5 and 6 are views also similar to Figures 1 and 2, showing how the benefits of the invention can be achieved in the case of a simple two-way valve of the differential-piston type.

Diagrammatic representations are deemed to be sufficient to disclose and explain the present improvement, since the valve body of the four-way valve represented in Figures 1 and 2, for example, and the valve elements and actuating piston associated with it, are substantially of the character shown and fully described in United States Patent 2,624,585. Moreover, the dual pilot-valve control afforded by the present invention may be achieved by the employement of two solenoid valves of known character, each of two-way construction.

Referring first to Figures 1 and 2, the body 20 of the four-way valve may be composed of cast bronze or the like, and may be fabricated of separate castings and elements suitably secured together in well-known fashion, to provide within the body a longitudinal hollow sealed at one end by a fixed wall 22, and slidably supporting a differential piston at the other end. This piston has a piston part 80 of relatively large diameter, and a piston part 79 of reduced diameter.

The valve body is provided with two sets of opposed poppet-valve seats arranged in tandem. One set of seats (the set nearest the end wall 22) is designated 26 and 29, the seat 26 facing toward the left (as viewed in these figures) and the seat 29 facing toward the right. The other set of seats is designated 32 and 34, the seat 32 facing toward the left and the seat 34 toward the right.

The valve body 20 is so constructed and designed that it defines a series of aligned chambers. One of these chambers is the valve chamber 43 lying between the opposed valve seats 32 and 34; a similar valve chamber 47 lies between the set of opposed valve seats 26 and 29. Between the valve chambers 43 and 47 there is an exhaust chamber 53 from which an exhaust pipe 55 extends. On the outside of the valve chamber 47 there is a pressure chamber 63, and on the outside of the valve chamber 43 there is a pressure chamber 62, the chambers 62 and 63 being designated "pressure" chambers because they are in continuous communication with each other, as indicated at 59, and with a suitable source or supply of fluid under pressure (not shown) through the pressure inlet 64. Adjacent to the pressure chamber 62 is the smaller piston chamber 87, and beyond this is the larger piston chamber 88. It will be observed that the outer part of the piston operates within the piston chamber 88, while the inner part of the piston operates within the adjacent piston chamber 87.

Within each of the valve chambers 43, 47 there is a valve element adapted to seat itself on one or the other of the corresponding set of valve seats. The valve element within the chamber 43 is designated 65, the corresponding valve element within the chamber 47 is indicated at 66. These elements are mounted on a common valve stem 25 secured to the differential piston, whereby movements of the latter between the two positions indicated in Figures 1 and 2 will cause corresponding movements of the valve elements 65, 66. With the parts in the relationship shown in Figure 1, the valve element 65 is seated upon and closes the inlet valve seat 34, whereas it is lifted off and has therefore opened the outlet valve seat 32. Similarly, the valve element 66 has closed the outlet valve seat 29 and opened the inlet valve seat 26. With the parts in the opposite setting indicated in Figure 2, the valve seats 26 and 32 are closed off, and the valve seats 29 and 34 are opened.

As will be understood, the valve seats and valve elements will be appropriately constructed in accordance with well-known practice to function in the contemplated manner. For example, the parts are so proportioned that when each valve element unseats from its inlet valve seat it will seat on the opposed aligned outlet valve seat, and vice versa. Preferably all the interior working parts are composed of stainless steel or the like, especially the valve seats and the valve elements that cooperate with them. Suitable resilient sealing means may be associated with each valve element, or with the valve seats themselves.

In the valve body 20, an opening 39 is formed, leading to the valve chamber 43. A similar opening 48 communicates with the valve chamber 47. In using the four-way valve, pipe connections (forming no part of the valve structure itself) are joined to the openings 39 and 48 and lead to the external chambers into which and from which fluid is to be alternately introduced and withdrawn. For example, a pipe or conduit 40 has been illustratively shown, connecting with the chamber 41 at one end of a hydraulic or pneumatic cylinder 42; and a similar pipe connection 49 is indicated as leading from the chamber 47 to the space 50 at the opposite end of the cylinder 42.

The operation of the differential piston is controlled by a pair of two-way solenoid pilot valves 10 and 11, these valves being individually operable. I have illustratively shown a push-button 12 arranged in the circuit of the coil 13 of the valve 10, and a similar push-button 14 arranged in the circuit of the coil 15 of the valve 11. In its normal de-energized state, the core 16 of the valve 10 rests upon and seals off the central port 17, and similarly the core 18 of the valve 11 normally rests upon and seals off the central port 19.

From the port 17 a communication is established, at 21, with the exhaust chamber 53. The other port of the valve 10 is connected by a pipe 23 to the piston chamber 88.

The central port 19 of the valve 11 is connected by a pipe 24 to the pipe 23, hence to the piston chamber 88, and the second port of the valve 11 is connected by a pipe 27 to the pressure chambers.

It will be observed that a pair of parallel fluid passages thus exists between the larger piston chamber 88, and the pressure and exhaust chambers respectively. One of these fluid passages consists of the pipe 23, the valve 10, and the pipe 21. The other consists of the pipes 23 and 24, the valve 11, and the pipe 27.

Assuming the parts to be in the relationships shown in Figure 1, the pressure of the actuating fluid upon the piston part 79 is unopposed by any pressure upon the larger face of the differential piston, since the pilot valve 10 has just been operated, with the result that fluid in the larger piston chamber 88 has been exhausted. Accordingly, the differential piston remains in the left-hand position shown, with the result that the valve chamber 47 is filled with fluid under pressure, while valve chamber 43 is connected to the exhaust. This means that there is fluid under pressure in the part 50 of the external cylinder 42, while the space 41 is connected to the exhaust. Hence the piston in the cylinder 42 is in the upper position shown.

With the parts in this relationship, any actuation of the solenoid valve 10 is ineffective to produce any change. In order to shift the parts to the relationships shown in Figure 2 it is necessary to energize the pilot valve 11 by pressing upon the push-button 14. As soon as this is done, fluid under pressure flows from the pipe 27 through the valve 11 into the pipe 24, hence into the piston chamber 88. Since the piston face in this chamber is larger than the inner face of the differential piston, the resultant force upon the piston is toward the right, and the parts are thus moved forthwith into the positions shown in Figure 2. It will be observed that the valve 11 need not be continuously energized. Merely a momentary energization is sufficient to establish the conditions shown in Figure 2, and the push-button 14 can be released almost immediately, thus restoring the parts of the valve 11 into the closed relationship shown.

With the valve parts in the right-hand position, as shown in Figure 2, the valve chamber 43 is filled with fluid under pressure, hence this fluid finds its way into the space 41 in the external cylinder 42. At the same time the valve chamber 47 is brought into communication with the exhaust chamber 53, and this in turn results in connecting the space 50 of the cylinder 42 with the exhaust. Hence the piston in the cylinder 42 assumes the position at the lower end of the cylinder, as shown in Figure 2.

Further energization of the pilot valve 11 at this stage will effect no change, but the parts can be restored immediately to the condition of Figure 1 by momentarily energizing the pilot valve 10 to unseat the core 16 from the port 17 and allow the fluid under pressure within the piston chamber 88 to escape through the pipes 23 and 21 to the exhaust.

It will thus be observed that only a momentary energization of either of the pilot valves is needed to actuate the main valve, and once the latter has been brought into one or the other of its two settings, it will remain in that position even though both pilot valves are de-energized. The advantages of this lie in the fact that power failure has no effect upon the setting of the main valve; and the extremely short duration of energization of each pilot valve permits relatively large currents to be used with impunity. A forceful action can thus be obtained with a pilot valve of relatively small size, and with a relatively low consumption of power.

As a further assurance against disturbance of the main valve, once it has been moved into one or the other of its settings, a special communication is established at 28 between the pipe 24 (hence the larger piston chamber 88) and the valve chamber 43. The valve chamber 43 is provided with an opening 30 with which the pipe 28 communicates. This opening is of relatively small cross-sectional area, so that the special communication established at 28, 30 has a relatively small fluid capacity and is in the nature of a "bleed." The provision of this "bleed" takes advantage of the fact that the pressure in the valve chamber 43, i. e., the one nearest to the larger piston chamber 88, is always the same as that in the latter chamber. Thus, in Figure 1, it will be noted that both the piston chamber 88 and the valve chamber 43 are connected to the exhaust; while in Figure 2 both the piston chamber 88 and the valve chamber 43 are in communication with the supply of high pressure fluid. As a result, any leakage through either of the pilot valves is rendered powerless to alter the setting of the differential piston.

The purpose and mode of operation of the "bleed" can best be explained by assuming the valves 10 and 11 to be leaky. In Figure 1, in the absence of the "bleed" communication 28—30, leakage of high pressure fluid past the valve 11 into the pipe 24 would gradually build up a pressure within the larger piston chamber 88 and in the course of time the differential piston would be shifted gradually from its left-hand setting to the piston of Figure 2. Due to the presence of the "bleed" communication at 28—30, however, any leakage of high pressure fluid past the valve 11 will be exhausted through the "bleed" and thus will not build up any pressure in the piston chamber 88.

Similarly, let it be assumed that there is no "bleed" communication 28—30, and that the valve 10 is leaky (Figure 2). The high pressure fluid in the piston chamber 88 would obviously leak slowly into the pipe 21 and out through the exhaust, thus ultimately allowing the continuous high pressure fluid in the smaller piston chamber 87 to move the piston toward the left. Due to the communication established at 28—30, however, the larger piston chamber 88 is assured of a constant communication with the supply of fluid under pressure, and any leakage through the valve 10 would cause a loss of the supply fluid through the pipe 24, the valve 10, and the valve 21 to the exhaust, and thus would not impair the maintenance of the full fluid pressure in the piston chamber 88.

To indicate the usefulness of the invention with differential-piston valves other than four-way valves, I have shown how the benefits of the invention may be achieved in connection with a three-way valve in Figures 3 and 4, and with a simple two-way valve in Figures 5 and 6. Since the parts are in each case similar to those illustrated in Figures 1 and 2, except that there is only one valve chamber, the same reference numerals have been used to designate corresponding elements and passages, and in Figures 3 and 4 each reference numeral is modified by the letter "a" and in Figures 5 and 6 by the letter "b."

Thus, in Figures 3 and 4, the valve body defines in an adjacent intercommunicating axially aligned series, as before, a relatively large piston chamber 88a, a smaller piston chamber 87a, a pressure chamber 62a, a valve chamber 43a, and an exhaust chamber 53a. The differential piston has the larger and smaller parts 80a and 79a, and it is secured to the valve stem 25a which terminates in the valve element 65a operating within the valve chamber 43a. The element 65a moves back and forth between the inlet valve seat 34a and the outlet valve seat 32a. Assuming the parts to be in the relationships of Figure 3, the pressure of the actuating fluid upon the smaller piston part 79a retains the piston in the left-hand position shown and establishes a communication between the valve chamber 43a and the exhaust. Leakage (if any) through the pilot valve 11a is powerless to build up any undesired pressure in the larger piston chamber 88a, since any fluid under pressure leaking through the pilot valve port 19a would bleed directly to the exhaust through the special communication of restricted capacity established at 28a and 30a.

To shift the parts into the position of Figure 4, the pilot valve 11a is energized by means of a suitable push-button or other appropriate means (not shown) whereupon fluid under pressure flows from the pipe 24a and thence into the larger piston chamber 88a. Merely a momentary opening of the pilot valve 11a is needed to achieve this result and the pilot valve 11a can be allowed to resume its normally closed condition, as shown, almost immediately.

Leakage of fluid, if any, through the pilot valve 10a into the pipe 21a would not be at the expense of fluid in the larger piston chamber 88a but would cause merely a harmless loss of supply fluid from the pipe 24.

Thus in either setting of the valve, the parts are reliably retained in the desired relationship, and guarded against undesired gradual shifting of the differential piston which leaky pilot valves might otherwise give rise to.

To shift the parts from the setting of Figure 4 to that of Figure 3, the pilot valve 10a is momentarily activated by suitable means (not shown) such as a push-button switch or the like, as hereinbefore described.

The three-way valve of Figures 3 and 4 is useful for control purposes of various kinds, as will be readily understood. Connection is established at 39a with the desired control device (not shown). Since the port 39a is alternately connected to the supply of fluid under pressure (Figure 4) and to the exhaust (Figure 3) the control device used, which may be for example a single-acting power cylinder, is correspondingly pressurized and exhausted depending upon the setting of the valve.

The illustrative embodiment of the invention in a two-way valve is depicted in Figures 5 and 6. The normal function of such a valve is to start and stop the flow of a fluid in a pipeline but the valve may obviously be used for other purposes, if desired. Of course, in controlling the actuation of such a valve by means of a differential piston, it must be assumed that the pressure in the exhaust (i. e. in the downstream part of the pipeline) will remain substantially constant and at a valve allowing the differential piston to function in the contemplated manner.

The construction shown in Figures 5 and 6 is substantially the same as that of Figures 3 and 4, except that the valve chamber 43b has no outlet valve seat, and the parts are so proportioned that the valve element 65b will simply seat itself (Figure 5) and unseat itself (Figure 6) with respect to the inlet valve seat 34b. Moreover, there is no control-device port corresponding to that shown at 39 in Figures 1 and 2, and at 39a in Figures 3 and 4.

The operation of the valve of Figures 5 and 6, its control by means of the momentarily actuated pilot valves 10b and 11b, and the beneficial effects of the "bleed" communication 30b in guarding against a shifting of the piston due to possible leakage, will be readily understood from the description hereinbefore given. Figure 5 shows the differential piston in the position it assumes right after the pilot valve 10b has been actuated. Figure 6 shows the parts in the position assumed right after the pilot valve 11b has been actuated. In Figure 5, the valve element 65b is seated upon the valve seat 34b, and in Figure 6 it is unseated therefrom.

It will be observed that the features of the invention are instrumental, in each of the embodiments illustratively depicted, in effectuating a forceful and reliable actuation of the valve in relatively simple fashion and at low cost, and in assuring a maintenance of the valve in the desired setting regardless of power failure or possible pilot valve leakage.

It will be understood that the details herein illustrated and described may be varied in a number of respects by those skilled in the art without necessarily departing from the spirit and scope of the invention as expressed in the appended claims.

Having thus described my invention what I claim as new and desire to secure by Letters Patent is:

1. In a valve of the character described: a valve body defining in an adjacent intercommunicating axially aligned series a relatively large piston chamber, a smaller piston chamber, a pressure chamber, a valve chamber, and an exhaust chamber; said valve chamber having an inlet valve seat at the pressure chamber side; a valve element in said valve chamber for alternate seating on and lifting from said valve seat; a valve stem extending through said pressure chamber; a differential piston on said valve stem with its larger part in said larger piston chamber and its smaller part in said smaller piston chamber; a supply of fluid under pressure and means for maintaining it in constant communication with said pressure chamber; a pair of parallel fluid passages between said larger piston chamber and said pressure and exhaust chambers respectively; an independently operable normally closed pilot valve in each of said fluid passages; whereby alternate opening of said pilot valves will control the movements of said differential piston, hence of said valve element, and means establishing a constantly open communication of restricted capacity between the larger piston chamber and the valve chamber, said communication being positioned to alternately connect to the pressure chamber or to the exhaust according to the position of the valve.

2. In a valve of the character described: a valve body defining in an adjacent intercommunicating axially aligned series a relatively large piston chamber, a smaller piston chamber, a pressure chamber, a valve chamber, an exhaust chamber, a second valve chamber, and a second pressure chamber; a supply of fluid under pressure; means maintaining said pressure chambers in constant communication with each other and with said supply of fluid; each valve chamber having an inlet valve seat at the pressure chamber side and an outlet valve seat at the exhaust chamber side; a valve element in each valve chamber for alternate seating on the corresponding set of inlet and outlet valve seats; a common valve stem; a differential piston on said valve stem with its larger part in said larger piston chamber and its smaller part in said smaller piston chamber; a pair of parallel fluid passages between said larger piston chamber and said pressure and exhaust chambers respectively; an independently operable normally closed pilot valve in each of said fluid passages; whereby alternate opening of said pilot valves will control the movements of said differential piston, hence of said common valve stem and the valve elements secured to it, and means in the form of a bleed passage establishing a constantly open communication of restricted capacity between the larger piston chamber and the valve chamber nearest to it, said bleed passage alternately connecting to the pressure chamber or to the exhaust according to the position of the valve.

References Cited in the file of this patent
UNITED STATES PATENTS

| | | |
|---|---|---|
| 2,097,201 | Renkenberger | Oct. 26, 1937 |
| 2,605,079 | Miller | July 29, 1952 |
| 2,624,585 | Churchill | Jan. 6, 1953 |